United States Patent Office

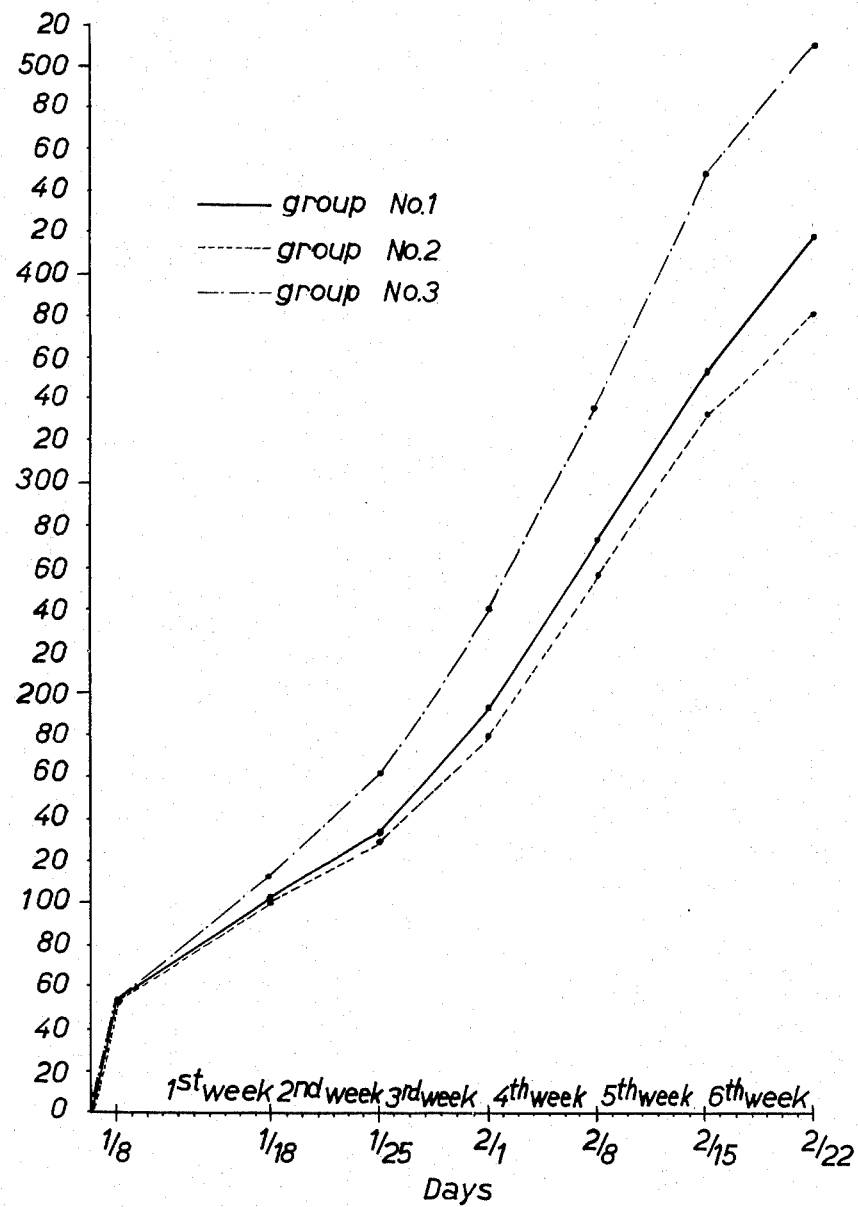

2,731,480
Patented Jan. 17, 1956

2,731,480

PROCESS FOR THE PRODUCTION OF ε-ACYL LYSINES

Winfried Kruckenberg, Leverkusen, Germany, assignor to Farbenfabriken Bayer Aktiengesellschaft, Leverkusen, Germany, a corporation of Germany Application March 18, 1954, Serial No. 417,125

Claims priority, application Germany March 19, 1953

3 Claims. (Cl. 260—404.5)

This invention relates to new food additives and to a process for producing the same.

In the present specification the term "acyl" refers to aliphatic acyl groups.

It is well known that the amount of lysine present in most vegetables is too small to make possible a full utilization of their protein content. Therefore, a considerable increase in the production of meat may be achieved by using synthetic lysine as a food additive for young cattle and poultry.

The supply of synthetic lysine, however, is limited since there does not exist any economical method for preparing the same. On the other hand, lysine very readily undergoes hydrolysis with formation of ammonia while its salts, which are more stable, are not taken by cattle because of their acid taste.

It is an object of the present invention to provide new food additives. Another object is to provide an economical process for preparing these new food additives. Still other objects will appear hereinafter.

It has been found that ε-acyl lysines are useful food additives for cattle and poultry. Furthermore, it has been found that ε-acyl lysines may very easily be prepared by saponification of caprolactam, acylation of the resulting ε-amino caproic acid, chlorination of the ε-acylamino caproic acid thus obtained and amination of the resulting ε-acylamino-α-chlorocaproic acid with ammonia to form the corresponding ε-acyl lysine.

The reactions underlying the process of the invention may be represented by the folowing equations:

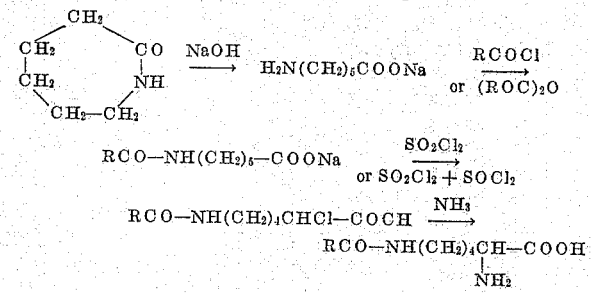

in which R is an alkyl group.

The saponification of caprolactam may be effected by conventional methods, for example by heating caprolactam with a sodium hydroxide solution.

In order to carry out the acylation it is not necessary to recover ε-amino caproic acid but the solution obtained in the saponification of caprolactam may directly be treated with the acylating agent.

Acylating agents which are suitable for the acylation include the anhydrides and halides of the aliphatic carboxylic acids.

The chlorination may be performed on the crude acylation product obtained upon neutralization and evaporation to dryness of the reaction mixture from the acylation step. Thus, the isolation of the pure acylamino caproic acids may be dispensed with.

Chlorinating agents which may be used for the chlorination are sulfuryl chloride and mixtures of sulfuryl chloride and thionyl chloride.

In carrying out the amination the reaction mixture obtained in the chlorination is reacted, upon hydrolysis and neutralization with sodium hydroxide, with ammonia under elevated pressure.

It has been found that the yield rises in proportion to the concentration of the ammonia solution employed for the amination step. Therefore, the amination is preferably carried out in the solutions which contain at least 50 per cent of ammonia based on water. Since the amination is adversely affected by the presence of iron it is preferable to use a non-iron or enamelled reactor for this step. Reactors made of high-grade alloy steels, such as V4A-steel, are likewise suitable for carrying out the amination.

The ε-acyl lysines obtained in accordance with the inventon are well crystallized compounds, which may be very easily isolated.

The invention is further illustrated by the following examples without being limited thereto:

*Example 1*

Three groups of chickens were given the same food, which contained only vegetable protein. To the food of group No. 2 there was added 0.2 per cent of methionine and to the food of group No. 3 there was added 0.7 per cent of ε-butyro lysine.

As may be seen from the attached figure, the chickens whose food contained ε-butyro lysine (group No. 3) put on weight more rapidly than the other chickens (groups No. 1 and 2).

*Example 2*

678 grams (6 mols) of caprolactam are refluxed with 1255 grams=850 cc. (14 mols) of 45 per cent sodium hydroxide solution for a period of 45 minutes while stirring. The homogeneous solution thus obtained is cooled to about 10° C. and mixed with 673 grams (6.6 mols) of acetic anhydride while maintaining the temperature at 10° C. and stirring. After the addition of acetic anhydride, stirring is continued for 30 minutes at a temperature of 10–20° C. Then the reaction mixture is neutralized by adding 1410 grams=1180 cc. (14.2 mols) of hydrochloric acid. The solution is now evaporated in vacuo, care being taken that the temperature does not exceed 90° C. By azeotropic distillation with benzene the water still contained in the residue is removed.

Now 160° grams of sulfuryl chloride are added dropwise at a temperature of about 50° C. The rate of addition is so chosen that the temperature does not exceed 60° C. (strongly exothermic reaction). Thereupon three portions of 800 grams sulfuryl chloride each are added at intervals of 30 minutes. During this phase of the chlorination the temperature is allowed to rise to 65° C. Then the temperature is kept at 70° C. for about 2 hours. Now the excess sulfuryl chloride is distilled off as completely as possible under reduced pressure at a temperature of about 70° C. During the reaction an efficient reflux condenser is used and the exit gases are passed through a trap cooled with an ice-sodium chloride mixture in order to condense the sulfuryl chloride contained therein. Now 1500 grams of water and ice are added to the reaction mixture at a temperature of 0–10° C. while cooling. The strongly acid solution is neutralized with concentrated sodium hydroxide solution at a temperature not exceeding 10° C. and the sodium chloride precipitated thereby is removed by filtration with suction.

The aqueous solution is placed in an enamelled autoclave and treated with such an amount (approximately 2500 grams) of gaseous ammonia as is required for obtaining a 50 per cent ammonia solution (based on water).

After sealing the autoclave the mixture is maintained at 95° C. for 1 hour. The autoclave is depressured at the same temperature thereby removing most of the ammonia. On removal of precipitated sodium chloride by filtration, the reaction mixture is evaporated to dryness in vacuo and pulverized. The amount of ε-acetyl lysine present in the product thus obtained corresponds to a yield of 75–80 per cent (based on caprolactam) of the theoretical. If a non-enamelled iron autoclave is used the yield amounts only to 70 per cent.

In carrying out the amination continuously, the above solution is heated to 120° C. and mixed with gaseous ammonia in a mixing jet, the amount of ammonia being such that a 50 per cent ammonia solution results. The mixture then flows through a system of tubes made of V4A-steel. The residence time is 5 minutes. By means of a spray drying apparatus ammonia and water are removed. Thus, a dry powder containing 50 per cent of ε-acetyl lysine, which corresponds to a yield of 75 per cent of the theoretical (based on caprolactam), is obtained.

*Example 3*

Following the procedure of Example 2 caprolactam is saponified with sodium hydroxide solution and the resulting ε-amino caproic acid acylated with acetic anhydride. The solution thus obtained is not acidified as described in Example 2, but directly evaporated to dryness. The last traces of water are removed from the residue by drying at 130° C. in vacuo until the product is absolutely dry. The chlorination is carried out by employing the same amount of sulfuryl chloride as stated in Example 2 and subsequently adding 75 grams of colorless thionyl chloride while maintaining the temperature at 40–50° C. until the evolution of hydrogen chloride is complete. Thereafter the reaction temperature is maintained at 50° C. for 2–3 hours. The reaction mixture is worked up and the reaction product is aminated according to the procedure described in Example 2.

*Example 4*

678 grams (6 mols) of caprolactam are refluxed for 45 minutes with 555 grams=375 cc. (6 mols) of 45 per cent sodium hydroxide solution while stirring. The acylating solution is cooled to 10° C. and mixed at this temperature with 351 grams (3.3 mols) of butyric acid chloride with stirring. After addition of 611 grams=413 cc. (6.6 mols) of 45 per cent sodium hydroxide solution another portion of 351 grams (3.3 mols) of butyric acid chloride is added with stirring. Stirring is continued for ½ hour and the mixture is then evaporated to dryness in vacuo.

To the crystalline dry residue there are added at a temperature not exceeding 40° C. 1.7 kilograms=1 liter of sulfuryl chloride and then 250 grams=150 cc. of colorless thionyl chloride. The temperature is raised to 50° C. which results in the evolution of hydrogen chloride and sulphur dioxide followed by the evolution of sulphur dioxide alone. After maintaining the temperature at 50° C. for 1 hour another portion of 1.7 kilograms of sulfuryl chloride is added and the temperature is raised to 55° C. over a period of 1 hour. Then a third portion of 1.7 kilograms of sulfuryl chloride is added and the temperature is maintained at 55° C. for 3 hours.

By cooling the exit gases 1 kilogram of sulfuryl chloride may be recovered therefrom. The sulfuryl chloride contained in the reaction mixture is removed by passing in carbon dioxide under reduced pressure. The reaction mixture is then added to 2 kilograms of ice while stirring. After the thawing of the ice through the heat of the saponification reaction, which very frequently does not start immediately, the mixture is made slightly alkaline with 1.3 kilograms=900 cc. of concentrated sodium hydroxide solution. Upon removal of the precipitated sodium chloride by filtration, the aqueous solution is treated in the autoclave with gaseous ammonia in such an amount (approximately 2500 grams) as to obtain a 50 per cent ammonia solution (based on water).

After sealing of the autoclave the mixture is heated to 95° C. and maintained at this temperature for 1 hour. Then the autoclave is depressured at 95° C. whereby most of the ammonia is removed. Precipitated sodium chloride is filtered off. The reaction mixture is then evaporated to dryness in vacuo and the residue is pulverized. The yield of ε-butyro lysine contained in the residue amounts to 75 per cent based on caprolactam.

*Example 5*

Following the procedure of Example 4 caprolactam is saponified and the resulting amino caproic acid reacted with butyric chloride. The N-butyro-ε-amino caproic acid thus obtained is chlorinated and the chlorination mixture hydrolised with ice and water. The pH of the solution is adjusted to 4.5 and the oily ε-butyroamino-α-chloro caproic acid thereby precipitated is freed from water and salt by centrifuging. Yield: 95 per cent. The product is dissolved in the equivalent amount of aqueous sodium hydroxide and aminated as described in Example 4. The reaction product contains only 1 mol of sodium chloride, which may be removed by recrystallizing from 95 per cent methanol.

*Example 6*

The procedure described in Example 4 is followed except that the equivalent amount of α-chloro butyric chloride is used instead of butyric chloride and the drying of the sodium salt is carried out at a low temperature in vacuo to prevent the halogen from being split off. The recovery of the ε-chloro butyroamino-α-chloro caproic acid is effected as described in Example 5.

*Example 7*

The procedure described in Example 4 is followed except that the equivalent amount of adipic acid chloride is used instead of butyric chloride. By acidifying to a pH of 4.5, the intermediates formed in the reaction steps may be precipitated in the form of crystals. The chlorination is much slower and takes at least 10 hours.

*Example 8*

The procedure described in Example 4 is followed except that 1442 grams (6.6 mols) of lauric acid chloride are used instead of butyric chloride. By acidifying, the intermediates formed in reaction steps may be precipitated in the form of crystals. The velocity of the chlorination is very low.

I claim:

1. In the process for the production of an ε-acyl lysine by chlorinating an N-acyl-ε-amino caproic acid, in which the acyl group is an aliphatic acyl group, and thereafter aminating the chlorinated product, the improvement which comprises effecting the chlorination, using a water-free salt of the N-acyl-ε-amino caproic acid as the starting material and sulfuryl chloride in the presence of thionyl chloride as the chlorinating agent.

2. The improvement in accordance with claim 1, which includes effecting the amination of the N-acyl-ε-amino-α-chloro caproic acid resulting from the chlorination with aqueous ammonia containing at least 50% by weight of water.

3. The improvement in accordance with claim 2, in which said amination is carried out in the substantial absence of iron.

References Cited in the file of this patent

UNITED STATES PATENTS 2,519,038    Galat _____ Aug. 15, 1950

OTHER REFERENCES

Neuberger et al.: Biochemical Jour., vol. 37, p. 515 (1943).